United States Patent [19]

Engelmann

[11] 4,339,265
[45] Jul. 13, 1982

[54] SEWAGE TREATMENT METHOD AND APPARATUS

[75] Inventor: John A. Engelmann, Wayzata, Minn.

[73] Assignee: Veda, Inc., Long Lake, Minn.

[21] Appl. No.: 125,115

[22] Filed: Feb. 27, 1980

[51] Int. Cl.³ .............................................. C05F 3/04
[52] U.S. Cl. ............................................. 71/9; 71/13; 71/22; 210/623; 210/625; 209/240; 209/325; 209/680
[58] Field of Search .......................... 71/9, 13, 21, 22; 210/623, 625; 209/240, 325, 674, 680

[56] References Cited

FOREIGN PATENT DOCUMENTS 167608 2/1916 Canada .
2706780 8/1978 Fed. Rep. of Germany ............ 71/9

OTHER PUBLICATIONS

New Processes of Waste Water Treatment & Recovery, Matlock 1978, pp. 201–213, Epstein et al.
Van Dole Shaker Feeder, Form No. 1-1408, 8/77.

Primary Examiner—S. Leon Bashore, Jr.
Assistant Examiner—Ferris H. Lander
Attorney, Agent, or Firm—Burd, Bartz & Gutenkauf

[57] ABSTRACT

A method and apparatus for treating sewage and converting the sewage into organic fertilizer which utilizes equipment for converting the solid material of the sewage into patties and a mixing apparatus for mixing the patties with bulking agents. The mixture of patties and bulking agents is stored in a pile and subjected to a supply of air to enhance the self-combustion or oxidation of the organic material in the patties. The bulking agents provide the patty-bulking agent mixture with air passages and pockets and minimize compaction of the patties. The self-combustion of the patties continues until the organic material is burned out, leaving a residual ash. A shaker separator having an elongated longitudinal perforated member is reciprocated to separate the ash from the bulking agents. The ash is collected and utilized as organic fertilizer. The bulking agents are recycled back to the mixing apparatus.

27 Claims, 6 Drawing Figures

SEWAGE TREATMENT METHOD AND APPARATUS

SUMMARY OF INVENTION

The invention is directed to an organic material treatment system and, more particularly, to a sewage treatment system embodying a method of treating and converting sewage and like waste materials into organic particulate material that can be used as organic fertilizer. In accordance with the method of the invention, the sewage, comprising a mixture of liquid and solid material, is collected in a holding means. The solid material is allowed to separate from the liquid. The liquid is then removed from the holding means. The solid material is taken from the holding means and converted into patties. The patties are generally flat pieces of solid material. During the conversion process, additional liquid is removed from the solid material.

The patties are mixed with bulking agents. The bulking agents are solid objects, as wood chips, that serve as spacers and fillers between the patties. The bulking agents and patties are then stored in a pile. The bulking agents provide the pile of mixed patties and bulking agents with air passages or porosity which allow air to flow through a pile. A supply of air is delivered to the pile of patties and bulking agents to enhance self-combustion of the organic matter of the patties. The combustion of the organic matter of the patties is an oxidation process which continues until the organic matter is burned out, leaving a residue of ash or particulate material mixed with the bulking agents.

The mixture of bulking agents and particulate material is separated from each other in separator means having at least one elongated longitudinal separation path. The path has an elongated perforated means, as a screen sieve, having a substantial longitudinal length and openings of a size to allow the particulate material to flow through the perforated means and retain the bulking agents. The separator means can employ a plurality of parallel elongated paths, each path being provided with elongated perforated means having substantial longitudinal length. The particulate material is discharged to a desired location for subsequent handling and packaging as organic fertilizer. The bulking agents are directed to a separate location and made available for subsequent mixing with additional patties.

The bulking agents, being continuously recycled, become smaller and less effective as a filler with the patties. The smaller size bulking agents are removed in a separation procedure prior to their reuse. A new supply of bulking agents is mixed with the recycled bulking agents to provide for the maximum utilization and effectiveness of the bulking agents.

The sewage treatment system has a holding structure defining a chamber for accommodating the sewage. The sewage is allowed to separate into liquid and solid material in the chamber. A pump means operates to remove the liquid from the chamber, leaving the settled solid material. The wet solid material is deposited in a machine for converting the solid material into patties. During the patty conversion process, additional liquid is removed from the solid material. The patties are preferably generally flat pieces or discs of solid material. The patties are delivered to a mixing apparatus where they are mixed with bulking agents. The bulking agents are solid objects, such as wood chips and the like, that provide filling, bulk, and porosity to the mixture of patties and bulking agents.

The mixed patties and bulking agents are moved from the mixing apparatus and stored in a pile in a storage location. An air pump operates to deliver a supply of air to the pile to enhance self-combustion of the organic material of the patties. The combustion is an oxidation process that reduces the patties to a residue of particulate material or ash. The bulking agents are spacer objects which provide air passages and pockets to insure the movement of air throughout the pile of patties and bulking agents. This insures oxidation of substantially all of the organic matter in substantially all the patties. The mixture of bulking agents and particulate material is moved by a conveyor to a separator means. The bulking agents and particulate material can be subjected to a mixing process prior to their introduction to the separator means.

The separator means comprises one or more elongated longitudinal reciprocating shaker separators. Each shaker separator has a substantial elongated separating path which separates the particulate material from the bulking agents and carries the particulate material to a first location and the bulking agents to a second location. Each shaker separator has a generally U-shaped elongated longitudinal trough having a bottom wall for carrying particulate material and an open discharge end adjacent the first location. A perforated means is located above and extends longitudinally the length of the bottom wall. The trough has upright longitudinal side walls. The perforated means is located between the side walls and secured thereto. The perforated means has an end section which extends through the open discharge end of the trough to carry the bulking agents to the second location. The mixture of bulking agents and particulate material is supplied to the inlet end of the perforated means. The perforated means, along with the U-shaped trough, is reciprocated in the longitudinal direction of the trough whereby the particulate material falls through the holes in the perforated means onto the bottom wall. Bulking agents are retained on the perforated means and carried thereby to the second location. The first location can accommodate a conveyor or means for moving the bulking agents to a storage area for subsequent use.

DESCRIPTION OF PREFERRED EMBODIMENT

Figure 1:
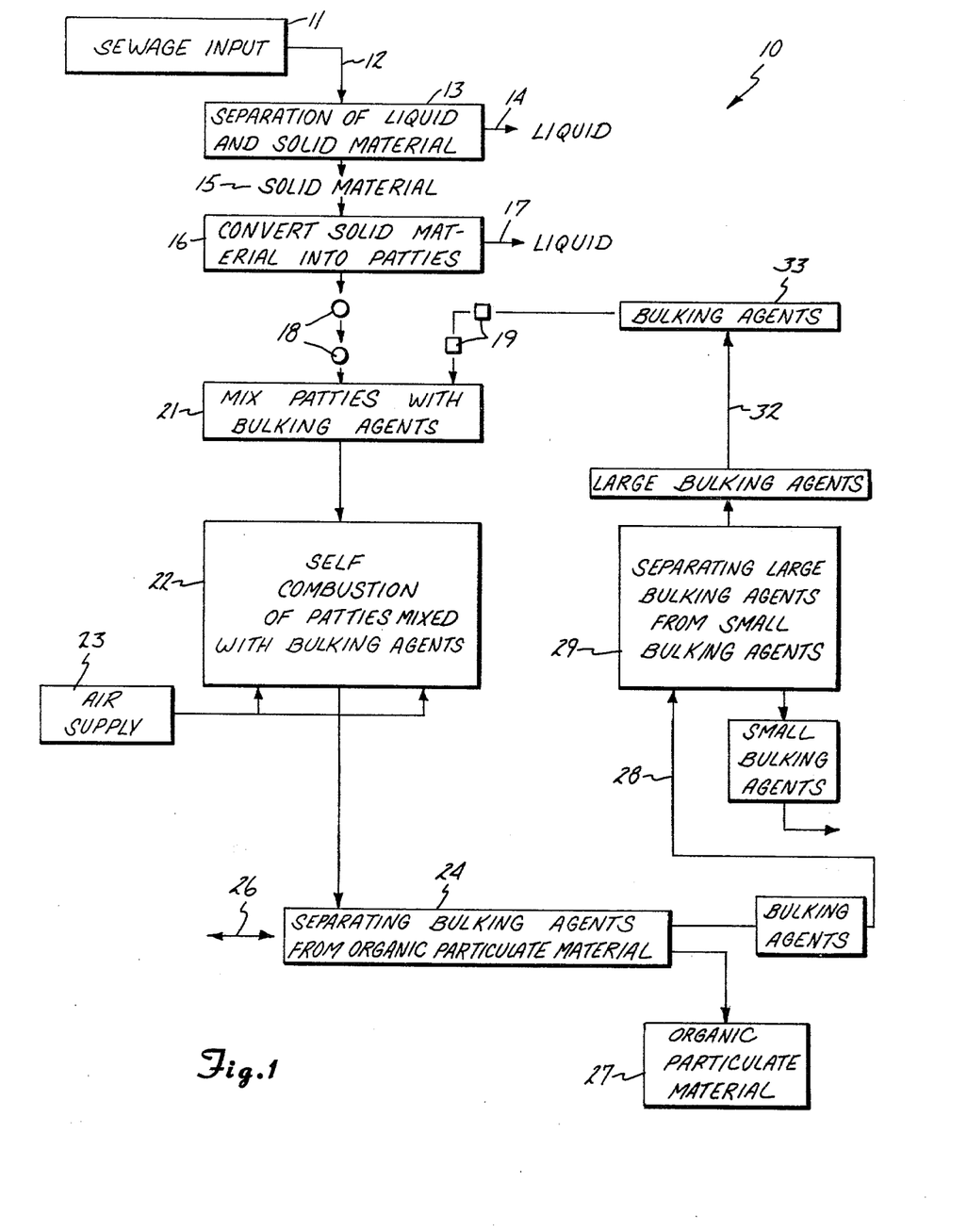
FIG. 1 is a block diagram showing the method of treating sewage and converting the same into organic fertilizer of the invention.

Referring to FIG. 1, there is shown a block diagram indicated generally at 10 of the sewage treatment system of the invention. The treatment system embodies a method for treating and converting raw sewage 12 and like waste materials from a sewage input 11 into organic particulate material 27 useable as organic fertilizer. The sewage 12, a mixture of liquid and solid material, is discharged into a holding structure 13. The solid material is primarily organic matter that must be processed before it is useable as organic plant fertilizer. The solid material is mixed with water and liquid wastes that are collected in sewer systems of urban areas and carried to treatment plants. In the process of the invention, the liquid-solid material mixture or sewage is initially collected in holding structure 13 which serves as a liquid-solid separation means. The liquid-solid material separation is a gravitational filtering process wherein the heavier solid material will settle to the bottom of the holding structure. The holding structure can be a large lagoon, basin, pond, tank, vat, or the like. After the separation process has been completed, the liquid 14 is removed for subsequent treatment.

The solid wet material 15 is converted to generally flat patties 18 at 16. The patties are circular or disc-shaped pieces of solid material that have a generally uniform relatively thin thickness; for example, the patties can have a diameter of 4 to 6 inches and a thickness of about ¾ inch. Patties 18 can have other shapes and thicknesses. During the conversion of the solid material into patties, additional liquid 17 is pressed from the solid material. Solid material 15 is transported to the patty-making equipment with pumps or material handling equipment, such as material carrying vehicles and conveyors.

The patties 18 are mixed at 21 with bulking agents 19 derived from a supply of bulking agents 33. Bulking agents 19 are solid filler objects, as wood chips, hard board, pieces of rubber or plastic, and the like. Bulking agents 19 have irregular shapes and irregular outer surfaces. They can have general cubic and rectangular shapes. The size of the individual bulking agents varies. The bulking agents can have dimensions of 1 to 3 inches and thicknesses of ¼ to 2 or more inches. The bulking agents may have other dimensions and thicknesses. They serve as filler objects which minimize compaction and adhesion of the patties into a solid mass. The patties 18 stick to the bulking agents as they are mixed together. The mixture of patties 18 to bulking agents 19 is about one-to-one by volume. Other mixture ratios of patties 18 and bulking agents 19 can be used.

Patties 18 mixed with bulking agents 19 are stored in a pile and allowed to oxidize or self-combust over a period of time. Air from an air supply means 23 is directed through the mixture of the patties 18 and bulking agents 19 to sustain self-combustion or burning of the organic matter of the patties. During the self-combustion process the organic material is converted or burned into gas and a residue of organic particulate material or ash. The bulking agents dispersed throughout the patties serve as spacer objects to minimize the compaction of the patties and to allow air to flow through the pile 22 of patties and bulking agents. The combustion process is an oxidation reaction that continues for a period of time; for example, 21 days. During the oxidation there is a drying and a slow burning of the organic material into gas and organic particulate material or ash.

After the self-combustion action is completed or the patties 18 are burned out, the mixture of bulking agents and organic particulate material is delivered to elongated reciprocating separator means 24 having a separating path of substantial longitudinal length. The bulking agents and particulate material may be mixed or stirred to free the particulate material from the bulking agents before delivery thereof to the separator means. Separator means 24 is reciprocated in its longitudinal direction, as indicated by arrow 26 to divide the bulking agents 19 from the organic particulate matter 27. The organic particulate matter 27 is collected as it is discharged from the end of the separator means 24. The collected particulate matter can be either stored or packaged for subsequent use as an organic fertilizer.

Bulking agents 19 separated by separator means 24 are carried by a conveyor 28 to a means 29 for separating large bulking agents from the small bulking agents. The large bulking agents have a selected minimum size which is transferred by a conveyor 32 to the bulking agent storage area 33 for subsequent use. The smaller bulking agents are disposed of as they do not provide effective bulking or carrying material. Additional new bulking agents can be added to the bulking agents supply 33, as required.

Figure 2:
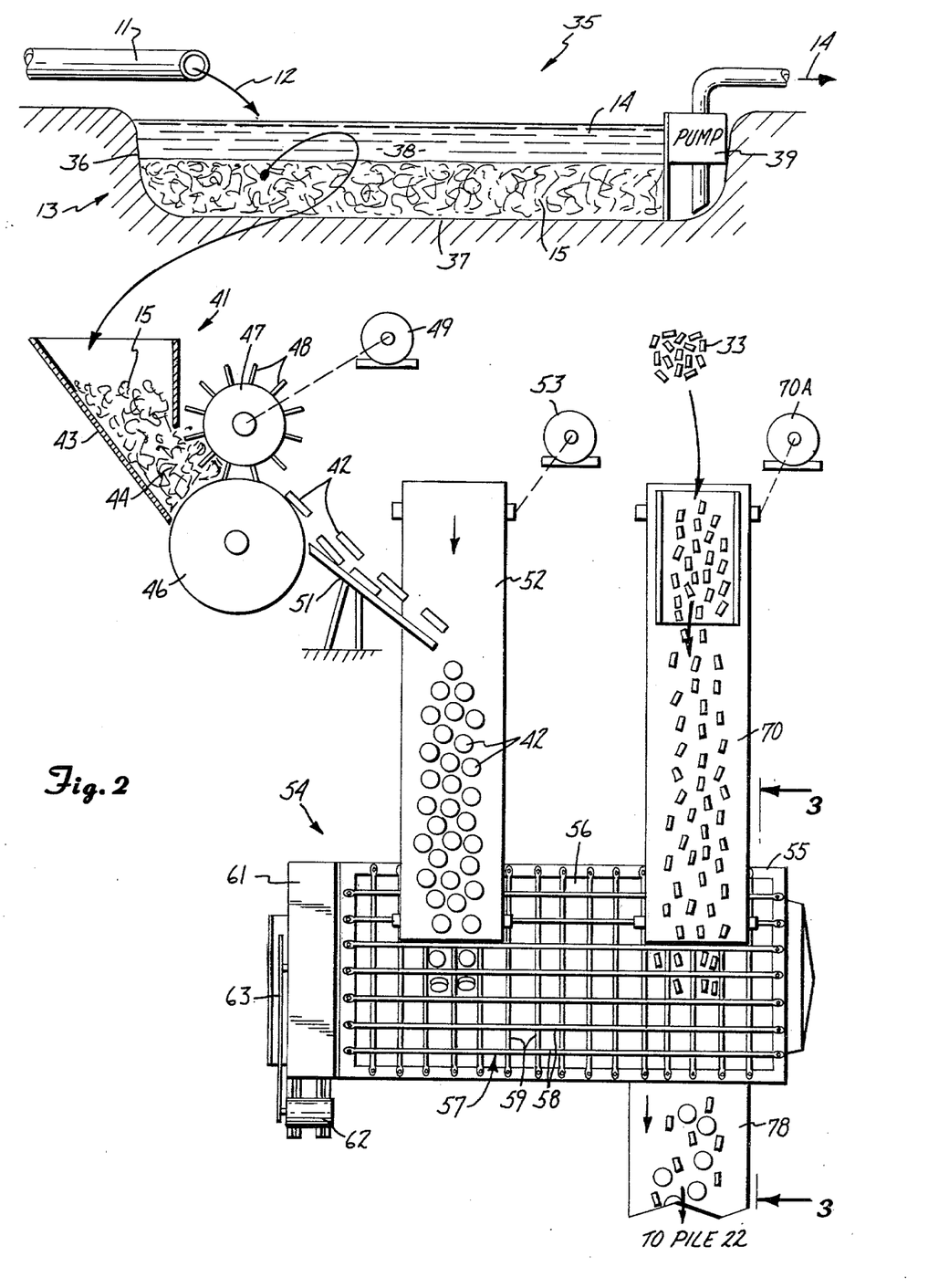
FIG. 2 is a diagrammatic view of the apparatus used in the method of FIG. 1 for separating liquid and solid material, converting solid material into patties, and mixing the patties with bulking agents.

Referring to FIG. 2, there is shown a diagrammatic view of the initial sewage processing of the sewage treatment system indicated generally at 35 of the invention. The sewage input 11 comprises a pipe which directs sewage 12 into the holding structure 13. Holding structure 13 can be a large lagoon, basin, pond, tank, or vat having a chamber for accommodating sewage 12. Holding structure 13 can be a structure erected on the ground or an excavation in the ground. The holding structure 13 has side walls 36 and a bottom 37 defining a generally horizontal space or chamber 38 accommodating sewage 12. The sewage 12 is a mixture of liquids and solid materials suspended in the liquid that accumulates in chamber 38 until the chamber is filled. Continued discharge of sewage 12 is diverted to a second holding structure. The sewage in chamber 38 is allowed to separate into liquid 14 and solid material 15. The separation is a gravitational process occurring over a period of time; for example, 24 hours. Liquid clearing and solid material settling agents can be added to the sewage to enhance the separation process. A pump 39 is operable to remove liquid 14 from chamber 38. Liquid 14 is directed to a subsequent treatment facility, such as liquid aeration and filtration beds. The liquid can be removed from chamber 18 by providing the bottom 38 with a porous structure allowing the liquid to flow through the settled solid material and drain from chamber 38. Other means can be used to remove the liquid from the chamber 38.

The solid material 15 is removed from chamber 38 and transported to and deposited into a machine indicated generally at 41 for converting the solid material into patties 42. Conveyors and material handling equipment are used to transport solid material 15 from chamber 38 to machine 41. Preferably, the patties are generally flat pieces or discs of solid material having a diameter of between 3 to 5 inches. Other sizes, shapes, and thicknesses of patties can be utilized in the process of the invention.

Machine 41 is a roller press having an input hopper 43 for accommodating solid material 15 removed from chamber 38. The hopper 43 has a discharge opening 44 for directing solid material 15 to a pair of rollers 46 and 47. Upper roller 47 has a plurality of outwardly directed blades or teeth 48 that engage an outer portion of the lower roller 46 to compress the solid material and form patties 42. A motor 49 drives the roller 47. A power transmission (not shown) may be used to drivably connect the rollers 46 and 47 whereby the rollers 46 and 47 continuously move the solid material 15 from hopper 43 to form and discharge the material as generally flat patties 42. Other equipment can be used to make the patties.

The patties 42 are directed by an out chute 51 onto a conveyor 52. Conveyor 52 is an endless belt conveyor driven by a motor 53 to carry patties 42 to a mixing apparatus indicated generally at 54. A conveyor 70 discharges bulking agents 19 into mixing apparatus 54. About equal amounts by volume of patties 18 and bulking agents 19 are mixed in apparatus 54. The ratio of patties to bulking agents can be changed to alter the density of the mixture. Conveyor 70 has an endless belt and is driven by a motor 70A, as an electric motor.

Mixing apparatus 54 can be the material mixer disclosed in U.S. application Ser. No. 115,184, filed Jan. 25, 1980. The subject matter of application Ser. No. 115,184 is incorporated herein by reference. Mixing apparatus 54 has a generally rectangular open top box 55 having a chamber 56 for accommodating patties 42. Mixing and conveying means 71, including augers 72 and 73 and conveyors 74 and 75, are located in the chamber to mix the patties with bulking agents 19 hereinafter described. An open grid structure indicated generally at 57 extends over the open top of the box and is secured to the outer peripheral upper edges of the box. The grid structure 57 comprises a plurality of laterally spaced longitudinal members 58 secured at their opposite ends to the ends of the box 55 and a plurality of laterally spaced transverse members 59 secured at their opposite ends to the sides of the box. A power box 61 mounted on box 55 is drivably connected to the mixing and conveying means in the box 71. A motor 62, as an electric motor, transmits power to the power box 61 through a power transmission 63, such as a belt and pulley drive. Mixing apparatus 54 has a base or frame 64 located on supports 66 and 67 to elevate a discharge opening 68 in the bottom of the box 55 above the ground.

Figure 3:
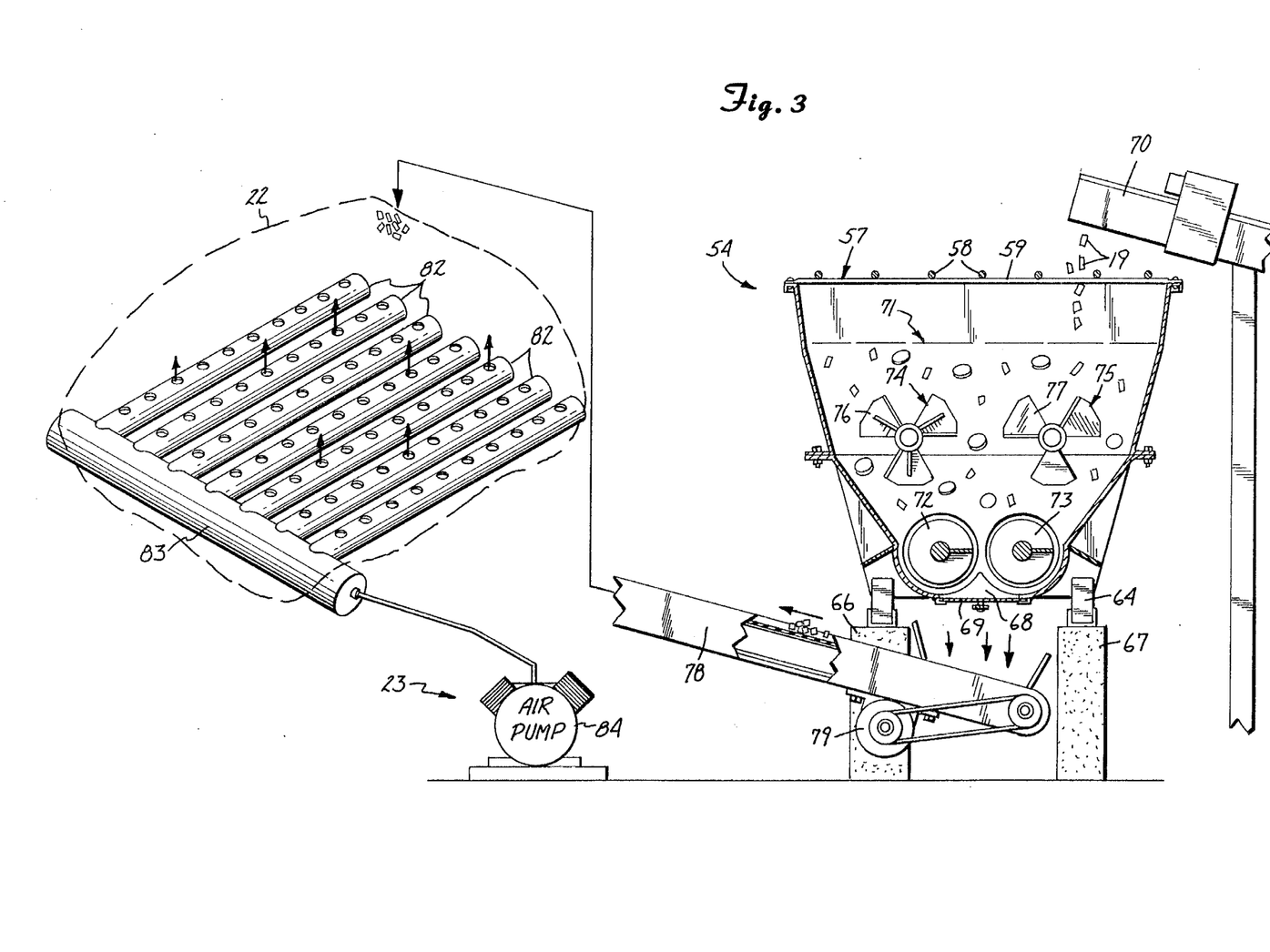
FIG. 3 is a diagrammatic view including a cross sectional view of a mixing apparatus taken along line 3—3 of FIG. 2 and the structure used to accomplish the self-combustion of the patties mixed with bulking agents.

Referring to FIG. 3, a door 69 slidably mounted on the bottom of the box 55 is operable to selectively open and close the discharge opening 68. Door 69 is in its closed position during the filling and mixing of patties 18 and bulking agents 19. Door 69 can be partially open so that a mixture of patties 18 and bulking agents 19 is continuously discharged from the mixing apparatus 54 into a conveyor 78 driven by motor 79 to transport the patties 18 and bulking agents 19 to pile or storage area 22. The mixing apparatus 54 has mixing and conveying means indicated generally at 71. The mixing and conveying means comprises a pair of longitudinal augers 72 and 73 located along the bottom of the box 55 and a pair of conveyors 74 and 75. The conveyors 74 and 75 have a plurality of circumferentially spaced paddles 76 and 77 which operate to convey and mix the patties and bulking agents in the upper portion of the chamber 56. A power box 61 operates to rotate augers 72 and 73 and conveyors 74 and 75. The details of the structure and operation of the material mixing and conveying means 71 are disclosed in U.S. application Ser. No. 115,184.

Bulking agents 19 are solid filler objects, as wood chips, hard board, pieces of rubber or plastic, and the like. Bulking agents 19 have irregular shapes and irregular outer surfaces. They can have general cubic and rectangular shapes. The size of the individual bulking agents varies. The bulking agents can have dimensions of 1 to 3 inches and thicknesses of $\frac{1}{4}$ to 2 or more inches. The bulking agents may have other dimensions and thicknesses. They serve as filler objects which minimize compaction and adhesion of the patties into a solid mass. The patties 18 stick to the bulking agents as they are mixed together. The mixture of patties 18 to bulking agents 19 is about one-to-one by volume. Other mixture ratios of patties 18 and bulking agents 19 can be used.

The pile 22 of mixed patties 18 and bulking agents 19 is located over an air supply means indicated generally at 23. The air supply means 23 comprises a plurality of perforated horizontal tubes or pipes 82 connected to a header or manifold 83. An air pump 84 operates to deliver a supply of air to the header 83. The air flows through tubes 82 and upwardly through pile 22 of patties 18 and bulking agents 19. The bulking agents 19 prevent patties 18 from merging and compacting into an air impervious mass of solid material. The bulking agents 19 provide the mixture with air passages and air voids that allow the air to come in contact with the patties and flow up through pile 22. The air moving through pile 22 causes drying and internal self-combustion or oxidation of the organic matter in the patties 18. The combustion temperature is below the burning temperature of the bulking agents. The oxidation process is continued for a period of time; for example, 21 days, or until the organic material is burned out. During the oxidation process, the organic matter is continuously oxidized which generates heat, causing the solid organic material to burn into a compost, ash, or particulate material 27. The particulate material is a fine granular organic material that comprises the remains or residue of the organic matter after the oxidation process has been completed.

Figure 4:
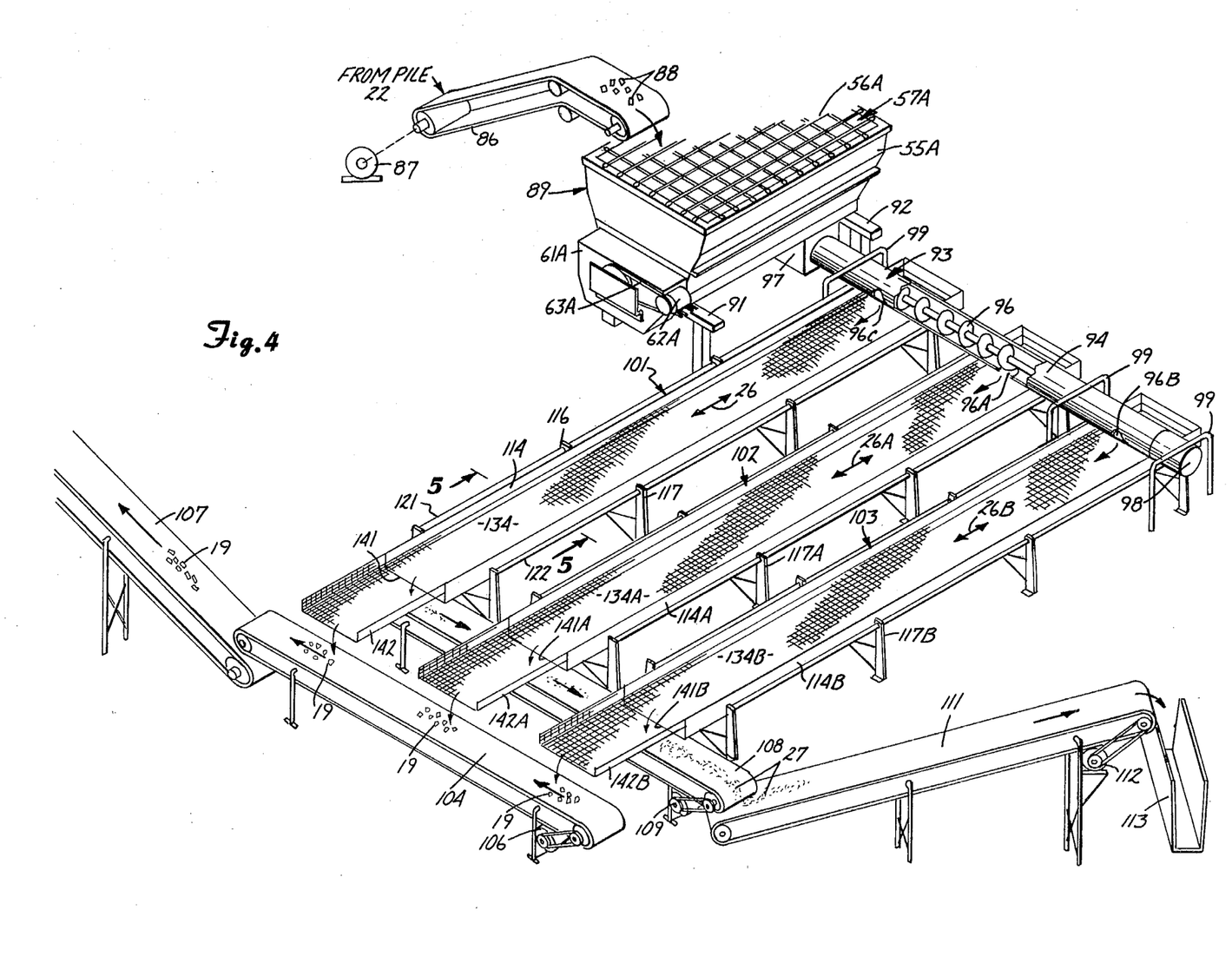
FIG. 4 is a perspective view of the separator means for separating particulate material from the bulking agents.

Referring to FIG. 4, bulking agents 19 and particulate material 27 or mixed material 88 are removed from pile 23 with a conveyor 86 driven by a motor 87. Material 88 is deposited into a second mixing apparatus indicated generally at 89. Mixing apparatus 89 is identical to the mixing apparatus 54. Like parts have the same reference numeral with the suffix A. Apparatus 89 breaks up groups of bulking agents and frees particulate material from the bulking agents. Mixing apparatus 89 is mounted on a pair of upright supports 91 and 92 to space the bottom of the apparatus 89 above the ground. A conveyor indicated generally at 93 has an end extended under the mixing apparatus 89 to receive the mixed material 88 from the discharge opening 58A. A conveyor 93 deposits the material 88 in a plurality of longitudinal elongated separators indicated generally at 101, 102, and 103. The mixing apparatus 89 may be a hopper or a bin for storing the material so that the conveyor 93 has a continuous supply of material.

Conveyor 93 has an elongated generally horizontal tube 94 surrounding a rotatable auger 96. Auger 96 extends from a hopper 97 at the inlet end of the tube 94 adjacent the bottom of mixing apparatus 89. A motor 98 is operatively connected to auger 96 to rotate auger 96 to move material 88 from hopper 97 into each separator 101, 102, and 103. A plurality of stands 99 support tube 94 and locate the tube 94 adjacent the input ends of the separators 101, 102, and 103. The tube 96 has a plurality of discharge openings 96A, 96B, and 96C which allow the material 88 to be dispensed from tube 94 onto the separators 101, 102, and 103. The openings 96A, 96B, and 96C are located in the lower sections of tube 96 above the separators 101, 102, and 103. Adjustable doors or gates can be mounted on tube 96 to change the size of openings 96A, 96B, and 96C. Other types of conveyors can be used to provide a continuous supply of material 88 to separators 101, 102, and 103. The tube 94 can be provided with suitable doors or gates so that one or more of the separators 101, 102, and 103 can be provided with the material 88 so that the non-used separator can be serviced and repaired without interrupting the operation of the remaining separators.

As shown in FIG. 4, a first conveyor 104 driven by motor 106 is located adjacent the discharge end of the separators 101, 102, and 103. Conveyor 104 carries the bulking agents 19 to a second conveyor 107. The bulking agents 19 are delivered to area 33 for subsequent delivery to mixing apparatus 54.

A bulking agent separator 29 can be interposed between the conveyor 107 and area 33 to separate the small or fine bulking agents from the larger bulking agents above a selected size. During the oxidation process in pile 22 and the mixing and separating of the bulking agents with the patties and particulate material, the size of the bulking agents is reduced. The smaller bulking agents are separated from the larger bulking agents recovered by the separators 101, 102, and 103, as the small bulking agents do not enhance the porosity of the mixture of patties and bulking agents.

A second transverse conveyor 108 operated with motor 109 is located adjacent the discharge end of the separators 101, 102, and 103 for receiving the particulate material or ash 27. The conveyor 108 delivers the particulate material 27 to a conveyor 111 driven by a motor 112. The material 27 is deposited in a container 113, such as a bag, used to store and market the organic fertilizer.

Separators 101, 102, and 103 are identical in structure and simultaneously operate to separate the bulking agents 19 from the particulate material 27. Separators 101, 102, and 103 are located in parallel relationship to each other. Each separator has a substantial longitudinal length and a long separation path; for example, each separator can have a length of 50 feet. The following description is limited to the structure, operation, and function of the separator 101. Separators 102 and 103 have identical parts that are identified by the same reference numerals having the suffixes A and B, respectively.

Figure 5:
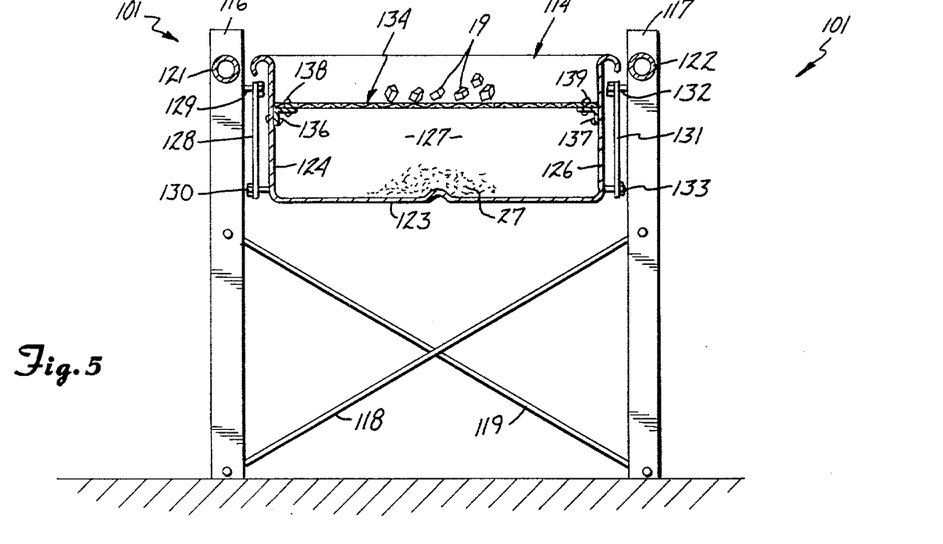
FIG. 5 is an enlarged sectional view taken along the line 5—5 of FIG. 4.

Separator 101 has an elongated longitudinal U-shaped trough 114 having an open top and open discharge end, as shown in FIG. 5. Trough 114 is located between a pair of upright posts 116 and 117 supported on the ground 115. Cross braces 118 and 119 are secured to the lower portions of posts 116 and 117 to maintain the upright positions of the posts. The mid-sections of posts 116 and 117 and posts adjacent thereto are connected with generally horizontal tubular rails 121 and 122. The trough 114 has a bottom wall 123 joined to upright longitudinal side walls 124 and 126 forming a U-shaped pan structure. The bottom wall 123 and side walls 124 and 126 form an elongated longitudinal separation space or chamber 127. A plurality of links 128 and 131 movably support trough 114 on posts 116 and 117. Opposite ends of link 128 are associated with pivots 129 and 130 that pivotally connect link 128 to post 116 and side wall 124. Pivots 132 and 133 pivotally connect opposite ends of link 131 to post 117 and side wall 126. A plurality of laterally spaced posts having links are located along the length of the trough 114 to support the trough 114 for general horizontal swinging or reciprocal motion. Other structures can be used to movably support trough 114 on posts 116 and 117.

A perforated means 134 is located in chamber 127 above bottom wall 123. The perforated means 134 is a sieve or screen comprising a generally rectangular network of longitudinal and transverse rod members that are laterally spaced from each other to provide holes of a size to allow the particulate material 27 to fall to the floor 123 and retain the bulking agents 19 on the perforated means. The perforated means 134 can be a floor or sheet member provided with a plurality of holes. The perforated means 134 can be an upper screen of a coarse mesh to remove bulky or large bulking agents and a lower screen of a mesh to provide the desired particle size and consistency of the particulate material. The particulate material falls through the lower screen onto the bottom wall. The opposite lateral sides of perforated means 134 are supported on longitudinal angle members 136 and 137. Fasteners 138 secure the angle members 136 and 137 to the inside of trough wall 124. Fastener members 139 secure angle member 137 to the inside of trough wall 126. Other structures can be used to mount perforated means 134 to side walls 124 and 126; for example, perforated means can be provided with side flanges that are bolted to side walls 124 and 126. Perforated means 134 is located below the plane of the upper edges of the side walls 124 and 126 and extends the full length of trough 114. As shown in FIG. 4, the perforated means 134 has a U-shaped end section 142 that projects longitudinally from the discharge end 141 of the trough 114. End section 142 carries the bulking agents 19 to conveyor 104. End 141 is located above conveyor 108 so that the particulate material 27 is dispensed onto conveyor 108.

Figure 6:
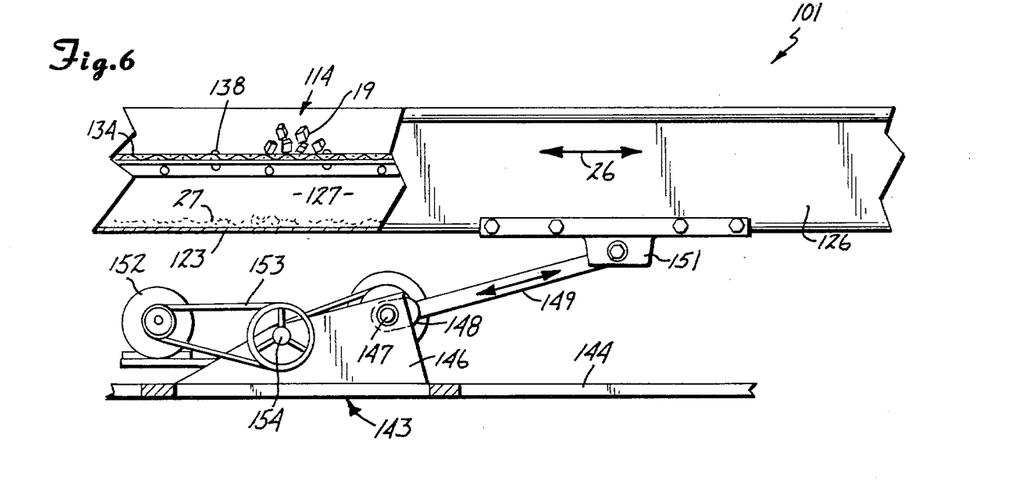
FIG. 6 is a side elevational view of the drive unit for reciprocating the trough of the separator means.

As shown in FIG. 6, a drive unit, indicated generally at 143, is operable to reciprocate trough 114 and perforated means 134 in the longitudinal direction of the trough 114. The drive unit 143 is mounted on a support 144 adjacent trough 114. A pair of upright plates 146 secured to the support 144 carry a shaft 147. An eccentric bearing 148 is mounted on shaft 147 and is connected to an arm 149. A bracket 151 secured to trough 114 is pivotally connected to arm 149 whereby rotation of shaft 147 causes the arm 149 to reciprocate thereby reciprocating trough 114, as shown by arrow 26. A motor 152, as an electric motor, drives shaft 147 through a belt and pulley power transmission 153. Transmission 153 includes a jack shaft 154 and chain and sprocket drive 156 connecting shaft 154 with shaft 147. The power transmission 153 can be a variable speed arrangement which allows the recoprocating speed to be changed to provide for the optimum separation of the particulate material 27 from the bulking agents 19.

The term solid material 15 includes wet and dry sewage and semi-solid sewage material that is converted into patties 18. The patties 18 can be semi-solid material having about 5% liquid.

While there has been shown and described a method and apparatus for treatment of sewage and converting the same into organic fertilizer, it is understood that changes in the method and apparatus can be made by those skilled in the art without departing from the invention. The invention is defined in the following claims.

The embodiments of the invention in which an exclusive property or privilege is claimed are defined as follows:

1. A method of treating sewage and converting the same into organic fertilizer comprising: collecting liquid and solid sewage material in liquid and solid material holding means having a lower section, separating part of the liquid from the solid material by allowing the solid material to settle in the lower section of the holding means, removing the liquid from the holding means, converting the solid material into patties, removing liquid from the solid material during the conversion of the solid material into patties, mixing the patties with bulking agents, locating the mixture of patties and bulking agents in a pile of mixed patties and bulking agents, moving air into the lower part of the pile of mixed patties and bulking agents to enhance self-combustion of the patties wherein the patties are oxidized to organic particulate material, mixing the bulking agents and oxidized organic particulate material, separating the mixed bulking agents and organic particulate material by reciprocating movement thereof in an elongated longitudinal path provided with a shaker means having an elongated longitudinal perforated means for carrying the bulking agents and allowing the particulate material to flow through the perforated means into an elongated trough having an open end, and separately collecting the bulking agents moving from the perforated means and particulate material moving from the open end of the trough.

2. The method of claim 1 wherein: the solid material is converted into generally flat patties.

3. The method of claim 2 wherein: liquid is removed from the solid material during the converting thereof into generally flat patties.

4. The method of claim 1 wherein: the perforated means of the shaker means is reciprocated in its longitudinal direction during the separation of the particulate material from the bulking agents.

5. The method of claim 1 including: separating small bulking agents from large bulking agents of a selected minimum size, said large bulking agents being subsequently mixed with the patties.

6. The method of claim 1 wherien: the patties are mixed with bulking agents in the ratio of about one-to-one by volume.

7. The method of claim 1 wherein: the solid material is compressed into patties and liquid is removed from the solid material during the compression thereof.

8. A method of treating semi-solid sewage material comprising: converting semi-solid sewage material into patties, removing liquid from the semi-solid sewage material during the conversion thereof into patties, mixing said patties with bulking agents, storing the mixture of patties and bulking agents in a pile, moving air into the pile of patties and bulking agents to enhance self-combustion of the semi-solid sewage material wherein the semi-solid sewage material is oxidized to organic particulate material, mixing the bulking agents and oxidized organic particulate material, mixing the bulking agents and oxidized organic particulate material, separating the mixed bulking agents and organic particulate material by reciprocating movement thereof in an elongated longitudinal perforated means for carrying the bulking agents and allowing the particulate material to flow through the perforated means into a trough having an open end, and separately collecting the bulking agents moving from the performated means and particulate material moving from the end of the trough.

9. The method of claim 8 wherein: the mixture of solid material and bulking agents are stored in the pile with said air being supplied to the lower portions of the pile of solid material and bulking agents.

10. The method of claim 8 including: separating small bulking agents from large bulking agents of a selected minimum size, said large bulking agents being subsequently mixed with patties.

11. The method of claim 8 wherein: the patties are mixed with bulking agents in a ratio of about one-to-one by volume.

12. The method of claim 8 wherein: the semi-solid sewage material is compressed into patties and liquid is moved from the sewage material during compression thereof.

13. The method of claim 8 including: conveying the particulate material along the longitudinal path of the shaker means below the perforated means to a location wherein the particulate material is collected.

14. The method of claim 8 wherein: the particulate material is separated from the bulking agents along the path of the perforated means, said bulking agents being conveyed by said perforated means to a first location where they are collected, said particulate material being conveyed along said longitudinal path of the shaker means below the perforated means to a second location where the particulate material is collected.

15. Means for treating sewage and converting sewage into fertilizer copmrising: holding means having a chamber for accommodating sewage consisting of a mixture of liquid and solid material, means for removing liquid from said chamber, means for converting the solid material collected in the chamber into patties, an apparatus for mixing the patties with bulking agents, means for moving the mixture of patties and bulking agents from said apparatus to a location, means for supplying air to the mixture of patties and bulking agents in the location to enhance self-combustion of the solid material of the patties, said solid material oxidizing and leaving a residue of particulate material, shaker means for receiving bulking agents and particulate material and separating the particulate material from the bulking agents, said shaker means including an elongated trough, said trough having a bottom wall extended longitudinally from an input end to a discharge end thereof, and an open end at the discharge end of the bottom wall, perforated means located above the bottom wall and extended longitudinally along the length of the bottom wall, said perforated means having a discharge end section extended through the open end of the trough beyond the discharge end of the bottom wall, said perforated means having a plurality of openings of a size to allow the particulate material to fall to the bottom wall and retain bulking agents on said perforated means, means for supporting the trough for movement in the longitudinal direction of the trough, drive means for reciprocating the trough and perforated means in said longitudinal direction whereby when particulate material and bulking agents are located on the perforated means, the particulate material is separated from bulking agents by the reciprocating perforated means and the particulate material moves along the bottom wall to the discharge end thereof, and said bulking agents move along the perforated means to the discharge end section thereof, means for receiving particulate material from the discharge end of the trough, and means for receiving bulking agents from said discharge end section.

16. The structure of claim 15 wherein: said apparatus includes box means having a chamber, material mixing means located in the chamber operable to mix patties and bulking agents in said chamber, said box means having a discharge opening allowing the mixture of patties and bulking agents to move to said means for moving said mixture to a location.

17. The structure of claim 15 wherein: said trough of the shaker means has upright side walls joined to the bottom wall, said perforated means extended between said side walls, and means connecting the perforated means to said side walls.

18. The structure of claim 17 wherein: said perforated means comprises at least one screen having a plurality of openings.

19. The structure of claim 17 wherein: said perforated means includes a plurality of longitudinal and transverse members defining a plurality of openings.

20. The structure of claim 15 wherein: said perforated means includes screen means having a plurality of openings.

21. The structure of claim 15 including: means for mixing the bulking agents and particulate material and delivering the mixed bulking agents and particulate material to said shaker means.

22. The structure of claim 15 wherein: said shaker means includes a plurality of shakers for receiving bulking agents and particulate material and separating the particulate material from the bulking agents, each shaker having an elongated trough, each trough having a bottom wall extended longitudinally from an input end to a discharge end thereof, and an open end at the discharge end of the bottom wall, perforated means located above the bottom wall and extended longitudinally the length of the bottom wall, said perforated means having a discharge end section extended through the open end of the trough and beyond the discharge end of the bottom wall, said perforated means having a plurality of openings of a size to allow the particulate material to fall to the bottom wall and retain bulking agents on said perforated means, means for supporting each trough for movement in the longitudinal direction of the trough, and drive means for reciprocating each trough and perforated means in said longitudinal direction whereby particulate material is separated from bulking agents by the reciprocating perforated means and the particulate material moves along the bottom wall to the discharge end thereof, said bulking agents moving along the perforated means to the discharge section thereof.

23. An apparatus for separating particulate material from bulking agents used in the handling and treating of solid sewage material comprising: shaker means for receiving bulking agents and particulate material and separating the particulate material from the bulking agents, said shaker means including an elongated trough having an input end and a discharge end, said trough having a bottom wall extended longitudinally from the input end to the discharge end thereof, and an open end at the discharge end of the bottom wall, perforated means mounted on the trough, said perforated means located above the bottom wall and extended longitudinally along the length of the bottom wall, said perforated means having a discharge end section extended through the open end of the trough beyond the discharge end of the bottom wall, said perforated means having a plurality of openings of a size to allow the particulate material to fall to the bottom wall and retain bulking agents on said perforated means, means for supporting the trough for movement in the longitudinal direction of the trough, drive means for reciprocating the trough and perforated means in said longitudinal direction when particulate material and bulking agents are located on the perforated means, the particulate material is separated from bulking agents by the reciprocating perforated means and the particulate material moves along the bottom wall to the discharge end thereof, and said bulking agents move along the perforated means to the discharge end section thereof.

24. The apparatus of claim 23 wherein: said trough has upright side walls joined to the bottom wall, said perforated means extended between said side walls, and means connecting the perforated means to said side walls.

25. The apparatus of claim 23 wherein: said perforated means comprises screen means having a plurality of openings.

26. The apparatus of claim 23 wherein: said perforated means includes a plurality of longitudinal and transverse members defining a plurality of openings.

27. The apparatus of claim 23 wherein: said perforated means comprises at least one screen having a plurality of openings.

* * * * *

UNITED STATES PATENT AND TRADEMARK OFFICE
CERTIFICATE OF CORRECTION

PATENT NO. : 4,339,265
DATED : July 13, 1982
INVENTOR(S) : John A. Engelmann

It is certified that error appears in the above-identified patent and that said Letters Patent are hereby corrected as shown below:

Column 9, line 44, "wherien" should be -- wherein --.

Column 9, line 60, after "material" delete -- mixing the bulking agents and oxidized organic particulate material, --.

Column 10, line 31, "copmrising" should be -- comprising --.

Signed and Sealed this

Seventh Day of September 1982

[SEAL]

Attest:

GERALD J. MOSSINGHOFF

Attesting Officer

Commissioner of Patents and Trademarks